Figure 1:
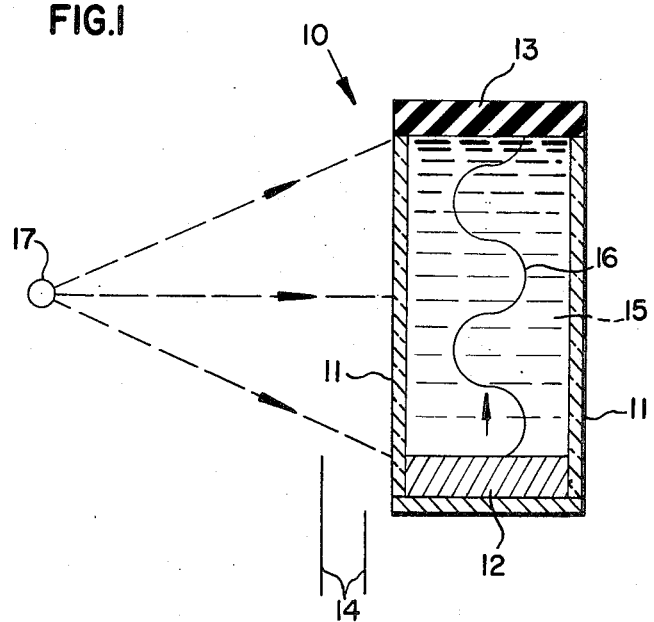

United States Patent

Hanlon

[15] 3,700,805
[45] Oct. 24, 1972

[54] BLACK-AND-WHITE IMAGE CONTROL BY ULTRASONIC MODULATION OF NEMATIC LIQUID CRYSTALS

[72] Inventor: Thomas F. Hanlon, 337 Tremont Avenue, Fort Lee, N.J. 07024

[22] Filed: Aug. 26, 1971
[21] Appl. No.: 175,395

Related U.S. Application Data

[63] Continuation of Ser. No. 782,659, Dec. 10, 1969.

[52] U.S. Cl............178/7.3 D, 250/199, 350/160 LC
[51] Int. Cl.................................................H04n 3/02
[58] Field of Search.........250/199; 178/7.3 D, 7.5 D, 178/5.4 BD; 350/160 LC, 161; 332/7.51; 23/230 LC

[56] References Cited

UNITED STATES PATENTS 3,035,491  5/1962  Rosenthal et al...........250/199
3,256,443  6/1966  Moore.......................250/199
3,297,876  1/1967  De Maria..................332/7.51

OTHER PUBLICATIONS

Scientific American, Vol. 211, Aug. 1964 "Liquid Crystals" pp. 77–85

Primary Examiner—Robert L. Griffin
Assistant Examiner—Donald E. Stout
Attorney—Frank Ledermann

[57] ABSTRACT

A modulator in which ultrasonic waves are generated by a video carrier potential applied to a piezoelectric transducer mounted in a glass-sided cell containing a nematic liquid crystal, is positioned in the path of light from a source consisting of a stroboscopically pulsed (at the rate of the speed of sound) visible light laser or non-coherent light source, to produce a complete black-and-white television image.

9 Claims, 2 Drawing Figures

PATENTED OCT 24 1972　　3,700,805

INVENTOR.
THOMAS F. HANLON
BY J. Ledermann
ATTORNEY

BLACK-AND-WHITE IMAGE CONTROL BY ULTRASONIC MODULATION OF NEMATIC LIQUID CRYSTALS This is a continuation of application, Ser. No. 782,659 filed Dec. 10, 1969.

It is well known that periodic changes of refractive index are caused by a compressional wave train acting upon a liquid medium through which passes light in a direction transverse to the direction of the wave train. Ultrasonic waves are an example.

An example of an ultrasonic light control means, or modulator, is disclosed in the Aug., 1939 issue of Proceedings of the I. R. E. in a paper entitled "The Supersonic Light Control and Its Application to Television with Special Reference to the Scophony Television Receiver." Quoting from this paper (page 484): "The supersonic light control consists of a glass-sided cell filled with a transparent liquid with a piezoelectric crystal having a natural frequency between 5 and 30 microseconds immersed in the liquid or inserted in one wall of the cell. The crystal is provided with electrodes on opposite faces and these electrodes are fed by a high-frequency carrier the frequency of which is approximately that of the crystal, and the amplitude of which may be modulated by the video-frequency signal received from the transmitter."

Basic elements of the "Supersonic" light control quoted above are utilized in the construction of the instant invention, with the basic exception that instead of a "liquid" (which actually was water) a nematic liquid crystal is used. Nematic liquid crystals have their overall molecular configuration altered by changes in compression, rarification and shear, forming light scattering centers which produce density changes. In the accompanying drawing, FIG. 1 is a largely schematic view showing the details of the instant ultrasonic modulator per se as used in relation to a light source.

Figure 2:
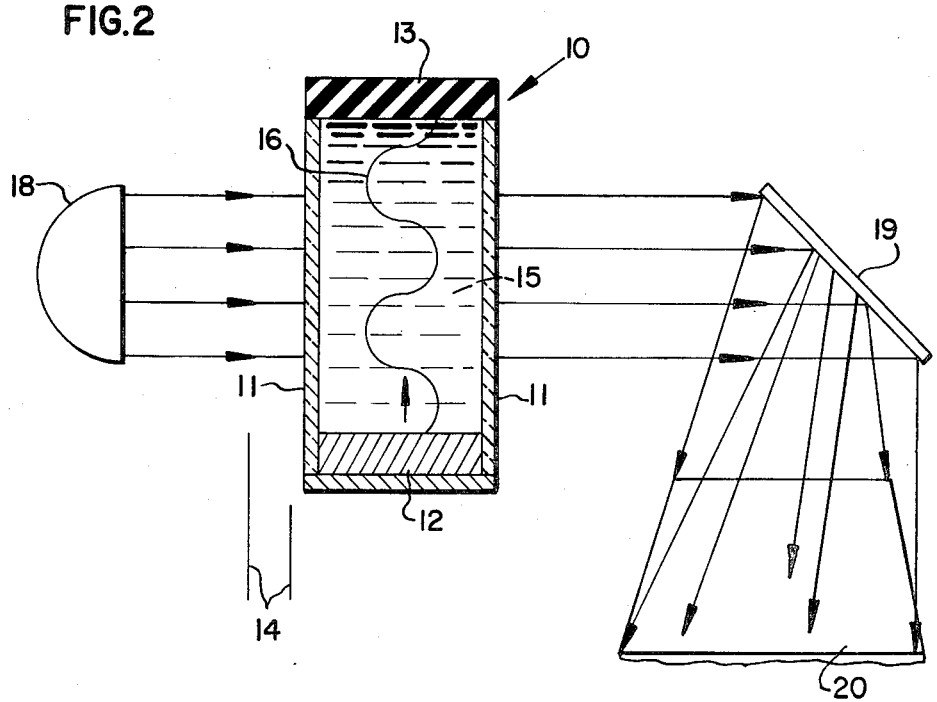

FIG. 2 is a schematic view illustrating an arrangement including the instant modulator for producing a complete television picture.

The modulator 10 has a number of applications in imaging systems, including television; it consists of a container or cell having opposed transparent, or glass, sides 11, a piezoelectric transducer 12 shown positioned in the bottom of the container, an attenuator 13 made, for example, of neoprene, at the opposite end of the container, and a nematic liquid crystal 15 filling the space between the transducer and the attenuator. Leads 14 serve to apply potentials to electrodes, not shown, on the opposed sides of the transducer. The numeral 16 designates a train of ultrasonic waves traveling through the liquid crystal in the direction of the arrow.

The cell 10 in an arrangement similar to that shown in FIG. 1 will provide black-and-white density control in a black-and-white receiver. Application of high frequency video voltage to the leads 14 causes the ultrasonic waves through the liquid to compress, rarify and shear the ordered clear molecular structure of the liquid crystals. The light emerging from the cell, the source of which is shown at 17, varies in density accordingly as the high frequency carrier voltage is modulated by the video signal, whereby light scattering or density centers are formed; the density changes are dependent upon changes in the high frequency voltage.

If, instead of attempting to produce a spot of light of element size, we shall have at the transducer end of the cell an amount of light proportional to the instantaneous value of the video signal received, and stretched out across the image of the cell we have at any and every instant a complete record, in light, of the signals sent out by the television transmitter during the preceeding (for example) 50 microseconds. The details of light and shade move along the length of this image at a speed corresponding to the velocity of sound in the nematic liquid crystal and therefore are invisible to the eye. If, however, the light source 18, FIG. 2, is a pulsed visible light laser or a pulsed non-coherent light, pulsed at the rate of speed of sound, the whole image is made to move across the screen (right-hand side of cell 10) at the same speed in the opposite direction, and those details will be immobilized and will become apparent to the eye. Each picture detail will then be illuminated from the moment the ultrasonic waves corresponding to it leave the transducer 12 until these same waves pass out of the illuminated portion and are terminated at the attenuator 13. The output of the modulator, or cell, 10, which has been stroboscopically stopped by the pulsed laser or pulsed non-coherent light source 18 is focused on to a slowly rotating mirror or galvanometer 19 that produces the vertical scan when synchronized with the vertical scan sync signal. Thus a complete television image is produced and this can be projected on to a screen 20 for viewing, or to photographic film for recording.

I claim:

1. An ultrasonic modulator comprising:
   a container having opposed transparent sides and ends bounding an inner cavity, a nematic liquid crystal disposed in said cavity,
   a piezoelectric transducer mounted in said cavity adjacent one of said ends of said container for imparting ultrasonic waves to said nematic crystal,
   an attenuator disposed in said cavity at the opposite end of said container, and
   means for applying high frequency video signals to said transducer so as to generate ultrasonic waves in said nematic crystal.

2. A modulator as in claim 1 further including a light source positioned with respect to said container so that light from said source passes through said transparent sides and is varied in density in accordance with said video signals.

3. A modulator as in claim 2 further including means for stroboscopicallly pulsing said light source at the speed of sound.

4. A modulator as in claim 3 wherein said light source is a laser.

5. A modulator as in claim 3 including light reflective means mounted for receiving the light which has passed through the transparent sides of said container and directing that light so as to produce a video line scan.

6. For use in electronic imaging systems, an ultrasonic modulator consisting of a container having opposed transparent sides, a piezoelectric transducer mounted therein spaced from one end thereof and having its opposed faces facing opposite ends of the container, the container having an attenuator mounted in said one end thereof, and a nematic liquid crystal filling the container between said attenuator and said transducer, the modulator positioned with respect to a light source so that the light passes through said transparent sides, a source of received high frequency video potential, means for applying said received high frequency video potentials to said piezoelectric transducer whereby said potentials generating modulated ultrasonic waves in said nematic liquid crystal thereby altering the molecular structure thereof so that light from said source varies in black-and-white density in accordance with the black-and-white density information conveyed by said potentials.

7. An imaging system for producing a complete black-and-white television image including an ultrasonic modulator consisting of a container having opposed transparent sides, a piezoelectric transducer mounted therein spaced from one end thereof and having its opposed faces facing opposite ends of the container, the container having an attenuator mounted in said one end thereof, and a nematic liquid crystal filling the container between said attenuator and said transducer, a light source stroboscopically pulsed at the speed of sound, the modulator being so positioned that light from said source passes through said transparent sides of the container, a source of received high frequency video carrier potential, the transducer having the received high frequency video carrier potential applied to said faces thereof thereby producing ultrasonic waves in said liquid crystal traveling from said transducer toward said attenuator consequently producing light scattering and density centers in the ordered molecular structure of said liquid crystal, said pulsed light source bringing said modulated beam of light to a stop thereby producing across the container all the video information in said video signal in a horizontal line, and a galvanometer synchronized with a video vertical sync signal for vertically modulating the horizontal video image thereby producing a complete black-and-white television image adapted to be projected on to a screen.

8. An imaging system according to claim 7, wherein said pulsed light source is a visible light laser.

9. An imaging system according to claim 7, wherein said pulsed light source is a noncoherent light source.

* * * * *